(12) United States Patent
McCowin

(10) Patent No.: US 9,884,472 B2
(45) Date of Patent: Feb. 6, 2018

(54) REDUCED COMPLEXITY AUTOMATIC FIBER PLACEMENT APPARATUS AND METHOD

(71) Applicant: The Boeing Company, Chicago, IL (US)

(72) Inventor: Peter D. McCowin, Enumclaw, WA (US)

(73) Assignee: THE BOEING COMPANY, Chicago, IL (US)

( * ) Notice: Subject to any disclaimer, the term of this patent is extended or adjusted under 35 U.S.C. 154(b) by 72 days.

(21) Appl. No.: 14/045,792

(22) Filed: Oct. 3, 2013

(65) Prior Publication Data

US 2014/0027065 A1     Jan. 30, 2014

Related U.S. Application Data

(62) Division of application No. 12/038,155, filed on Feb. 27, 2008, now Pat. No. 8,557,074.

(51) Int. Cl.
    *B29C 70/38* (2006.01)
    *B32B 37/00* (2006.01)
    *B29C 70/54* (2006.01)

(52) U.S. Cl.
CPC ........ *B32B 37/0046* (2013.01); *B29C 70/386* (2013.01); *B29C 70/388* (2013.01); *B29C 70/545* (2013.01); *B29C 70/382* (2013.01); *Y10T 156/1052* (2015.01); *Y10T 156/12* (2015.01)

(58) Field of Classification Search
CPC ... B29C 70/382; B29C 70/384; B29C 70/386; B29C 70/388
See application file for complete search history.

(56) References Cited

U.S. PATENT DOCUMENTS

| | | | |
|---|---|---|---|
| 799,374 A | 9/1905 | Gray et al. |
| 920,776 A | 5/1909 | Pohl |
| 1,132,837 A | 3/1915 | Eggleston |
| 1,195,554 A | 8/1916 | Bourdin |
| 1,370,339 A | 3/1921 | Midgley |
| 1,420,271 A | 6/1922 | McLane |
| 1,464,632 A | 8/1923 | Wayne |
| 1,512,096 A | 10/1924 | Hopkinson |
| 1,930,733 A | 10/1933 | Tomlin |

(Continued)

FOREIGN PATENT DOCUMENTS

| | | |
|---|---|---|
| DE | 2505223 A1 | 8/1976 |
| DE | 20120792 U1 | 5/2003 |

(Continued)

OTHER PUBLICATIONS

Final Office Action, dated Aug. 22, 2014, regarding U.S. Appl. No. 12/498,307, 9 pages.

(Continued)

*Primary Examiner* — Jeffry H Aftergut
(74) *Attorney, Agent, or Firm* — Yee & Associates, P.C.

(57) ABSTRACT

A method of forming a composite layup on a substrate comprises: moving an automatic fiber placement head over the substrate; using the fiber placement head to lay down multiple, parallel strips of composite tape on the substrate, including staggering the start of at least certain of the tape strips so as to form a contour pattern; and, cutting the ends of all of the tape strips using a single cut.

5 Claims, 11 Drawing Sheets

(56) References Cited

U.S. PATENT DOCUMENTS

| | | | |
|---|---|---|---|
| 2,182,358 A | 12/1939 | Sherts et al. | |
| 2,220,760 A | 11/1940 | Gates et al. | |
| 2,345,541 A | 3/1944 | Scholze, Jr. | |
| 2,722,590 A | 11/1955 | Engler | |
| 2,871,716 A | 2/1959 | Stade | |
| 3,037,898 A | 6/1962 | Zumofen | |
| 3,137,452 A | 6/1964 | Winders | |
| 3,329,181 A | 7/1967 | Buss et al. | |
| 3,574,040 A | 4/1971 | Chitwood et al. | |
| 3,602,416 A | 8/1971 | Basche et al. | |
| 3,684,278 A | 8/1972 | Takahaski | |
| 3,695,977 A | 10/1972 | Kandelaki et al. | |
| 3,775,219 A | 11/1973 | Karlson et al. | |
| 3,810,805 A | 5/1974 | Goldsworthy et al. | |
| 3,844,822 A | 10/1974 | Boss et al. | |
| 3,910,522 A | 10/1975 | Lee et al. | |
| 3,970,831 A | 7/1976 | Hegyi | |
| 3,992,240 A | 11/1976 | Kuehn, Jr. | |
| 4,091,979 A | 5/1978 | Browder | |
| 4,100,004 A | 7/1978 | Moss et al. | |
| 4,133,711 A | 1/1979 | August et al. | |
| 4,135,447 A | 1/1979 | Barnes et al. | |
| 4,186,861 A | 2/1980 | Steinhilber | |
| 4,208,238 A | 6/1980 | August et al. | |
| 4,234,374 A | 11/1980 | Frank | |
| 4,241,884 A | 12/1980 | Lynch | |
| 4,259,144 A | 3/1981 | Ballentine | |
| 4,267,951 A | 5/1981 | Grant et al. | |
| 4,285,752 A | 8/1981 | Higgins | |
| 4,292,108 A | 9/1981 | Weiss et al. | |
| 4,328,061 A | 5/1982 | Off et al. | |
| 4,351,688 A | 9/1982 | Weiss et al. | |
| 4,351,992 A | 9/1982 | Crouch | |
| 4,382,836 A | 5/1983 | Frank | |
| 4,419,170 A | 12/1983 | Blad | |
| 4,432,828 A | 2/1984 | Siempelkamp et al. | |
| 4,461,669 A | 7/1984 | Dontscheff | |
| 4,462,551 A | 7/1984 | Bloch | |
| 4,491,493 A | 1/1985 | Eaton | |
| 4,506,969 A | 3/1985 | Baker | |
| 4,508,584 A | 4/1985 | Charles | |
| 4,531,992 A | 7/1985 | Eaton | |
| 4,541,886 A | 9/1985 | Marlow et al. | |
| 4,557,783 A | 12/1985 | Grone et al. | |
| 4,557,790 A | 12/1985 | Wisbey | |
| 4,560,433 A | 12/1985 | Frank | |
| 4,569,716 A | 2/1986 | Pugh | |
| 4,574,029 A | 3/1986 | Murray | |
| 4,588,466 A | 5/1986 | Eaton | |
| 4,591,402 A | 5/1986 | Evans et al. | |
| 4,627,886 A | 12/1986 | Grone et al. | |
| 4,636,276 A | 1/1987 | Nozaka | |
| 4,680,806 A | 7/1987 | Bolza-Schunemann | |
| 4,696,707 A | 9/1987 | Lewis et al. | |
| 4,699,683 A | 10/1987 | McCowin | |
| 4,706,442 A | 11/1987 | Riemenschneider | |
| 4,707,212 A | 11/1987 | Hailey et al. | |
| 4,750,965 A | 6/1988 | Pippel et al. | |
| 4,781,782 A | 11/1988 | Luhman et al. | |
| 4,799,981 A | 1/1989 | Stone et al. | |
| 4,842,215 A | 6/1989 | Takami | |
| 4,867,834 A | 9/1989 | Alenskis et al. | |
| 4,877,471 A | 10/1989 | McCowin et al. | |
| 4,878,984 A | 11/1989 | Bourrieres | |
| 4,880,488 A | 11/1989 | Matsuo et al. | |
| 4,909,880 A | 3/1990 | Kittelson et al. | |
| 4,938,824 A | 7/1990 | Youngkeit | |
| 4,943,338 A | 7/1990 | Wisbey | |
| 4,978,417 A | 12/1990 | Grimshaw et al. | |
| 4,990,213 A | 2/1991 | Brown et al. | |
| 5,000,397 A | 3/1991 | Darrieux | |
| 5,015,326 A * | 5/1991 | Frank | B29C 70/388 156/353 |
| 5,041,179 A | 8/1991 | Shinno et al. | |
| 5,045,147 A * | 9/1991 | Benson | B29C 53/58 156/353 |
| 5,100,493 A | 3/1992 | Leclere et al. | |
| 5,110,395 A * | 5/1992 | Vaniglia | B29C 53/8016 156/175 |
| 5,114,519 A | 5/1992 | Grimshaw et al. | |
| 5,120,976 A | 6/1992 | Clayton et al. | |
| 5,148,572 A | 9/1992 | Wells et al. | |
| 5,197,198 A | 3/1993 | Onozato | |
| 5,200,018 A | 4/1993 | Gill et al. | |
| 5,213,646 A | 5/1993 | Zsolnay et al. | |
| 5,249,120 A | 9/1993 | Foley | |
| 5,290,386 A | 3/1994 | Trudeau | |
| 5,290,389 A * | 3/1994 | Shupe | B29C 53/8016 156/353 |
| 5,294,803 A | 3/1994 | Pahr | |
| 5,345,399 A | 9/1994 | Collins | |
| 5,397,415 A | 3/1995 | Manabe et al. | |
| 5,431,749 A | 7/1995 | Messner | |
| 5,448,505 A | 9/1995 | Novak | |
| 5,480,508 A | 1/1996 | Manabe et al. | |
| 5,482,589 A | 1/1996 | Shin et al. | |
| 5,560,942 A | 10/1996 | Curry | |
| 5,562,788 A | 10/1996 | Kitson et al. | |
| 5,627,647 A | 5/1997 | Baan et al. | |
| 5,645,677 A | 7/1997 | Cahuzac et al. | |
| 5,659,229 A | 8/1997 | Rajala | |
| 5,698,066 A * | 12/1997 | Johnson et al. | 156/441 |
| 5,700,347 A | 12/1997 | McCowin | |
| 5,725,175 A | 3/1998 | Thundathil | |
| 5,879,505 A | 3/1999 | Fujisawa et al. | |
| 5,954,917 A | 9/1999 | Jackson et al. | |
| 6,041,840 A | 3/2000 | Ogawa | |
| 6,073,670 A | 6/2000 | Koury | |
| 6,096,164 A | 8/2000 | Benson et al. | |
| 6,100,986 A | 8/2000 | Rydningen | |
| 6,112,792 A | 9/2000 | Barr et al. | |
| 6,164,477 A | 12/2000 | Druckman et al. | |
| 6,215,553 B1 | 4/2001 | Rider et al. | |
| 6,240,333 B1 | 5/2001 | McGee | |
| 6,262,814 B1 | 7/2001 | Furukawa | |
| 6,312,247 B1 | 11/2001 | Kassuelke et al. | |
| 6,315,235 B1 | 11/2001 | Breyer et al. | |
| 6,325,568 B1 | 12/2001 | Druckman et al. | |
| 6,391,436 B1 | 5/2002 | Xu et al. | |
| 6,436,528 B1 | 8/2002 | Kulper et al. | |
| 6,441,905 B1 | 8/2002 | Tojyo et al. | |
| 6,451,152 B1 | 9/2002 | Holmes et al. | |
| 6,459,494 B1 | 10/2002 | Kurokawa et al. | |
| 6,474,389 B1 | 11/2002 | Steelman et al. | |
| 6,520,234 B1 | 2/2003 | Anderson et al. | |
| 6,544,367 B1 | 4/2003 | Fujimoto et al. | |
| 6,638,388 B2 | 10/2003 | Nagata et al. | |
| 6,675,688 B2 | 1/2004 | Ostini | |
| 6,706,131 B2 | 3/2004 | Steelman et al. | |
| 6,748,836 B2 | 6/2004 | Vivirito et al. | |
| 6,752,190 B1 * | 6/2004 | Boll | B29B 15/08 156/173 |
| 6,764,754 B1 | 7/2004 | Hunter et al. | |
| 6,767,426 B1 | 7/2004 | Yamamoto | |
| 6,773,537 B2 | 8/2004 | Erickson et al. | |
| 6,799,081 B1 | 9/2004 | Hale et al. | |
| 6,799,619 B2 | 10/2004 | Holmes et al. | |
| 6,823,342 B2 | 11/2004 | Wallen et al. | |
| 6,860,957 B2 | 3/2005 | Sana et al. | |
| 6,900,547 B2 | 5/2005 | Polk, Jr. et al. | |
| 6,966,966 B2 | 11/2005 | Koizumi et al. | |
| 6,968,971 B2 | 11/2005 | Ely | |
| 6,979,501 B2 | 12/2005 | Merton | |
| 6,984,429 B2 | 1/2006 | Thunhorst et al. | |
| 7,010,544 B2 | 3/2006 | Wallen et al. | |
| 7,048,024 B2 | 5/2006 | Clark et al. | |
| 7,063,118 B2 | 6/2006 | Hauber et al. | |
| 7,137,182 B2 | 11/2006 | Nelson | |
| 7,206,665 B2 | 4/2007 | Groppe | |
| 7,213,629 B2 | 5/2007 | Ledet et al. | |
| 7,282,107 B2 | 10/2007 | Johnson et al. | |
| 7,293,590 B2 | 11/2007 | Martin | |
| 7,326,312 B1 | 2/2008 | Rust et al. | |

(56) References Cited

U.S. PATENT DOCUMENTS

| | | | |
|---|---|---|---|
| 7,337,818 B2 | 3/2008 | Briese et al. | |
| 7,341,086 B2 | 3/2008 | Nelson et al. | |
| 7,376,480 B2 | 5/2008 | Hagen et al. | |
| 7,407,556 B2 | 8/2008 | Oldani et al. | |
| 7,419,031 B2 | 9/2008 | Liguore et al. | |
| 7,455,740 B2 | 11/2008 | Bostanjoglo et al. | |
| 7,455,742 B2 | 11/2008 | Ledet et al. | |
| 7,472,736 B2 | 1/2009 | Kisch et al. | |
| 7,478,780 B2 | 1/2009 | Wilding et al. | |
| 7,517,426 B2 | 4/2009 | Mano et al. | |
| 7,527,084 B2 | 5/2009 | Kaczkowski | |
| 7,536,242 B2 | 5/2009 | Ledet et al. | |
| 7,591,294 B2 | 9/2009 | Wampler et al. | |
| 7,643,970 B2 | 1/2010 | Drumheller et al. | |
| 7,681,615 B2 | 3/2010 | McCowin | |
| 7,717,151 B2 | 5/2010 | Wampler et al. | |
| 7,747,421 B2 | 6/2010 | Tang et al. | |
| 7,748,425 B2 | 7/2010 | Tingley | |
| 7,766,063 B2 | 8/2010 | Lauder et al. | |
| 7,769,481 B2 | 8/2010 | Tang et al. | |
| 7,809,454 B2 | 10/2010 | Hu et al. | |
| 7,824,512 B2 | 11/2010 | Lauder et al. | |
| 7,842,145 B2 | 11/2010 | Hogg | |
| 7,849,903 B2 * | 12/2010 | Vaniglia | B29C 70/384 156/252 |
| 7,867,352 B2 | 1/2011 | Johnson et al. | |
| 7,922,856 B2 | 4/2011 | Hagman et al. | |
| 8,029,642 B2 | 10/2011 | Hagman | |
| 8,147,637 B2 | 4/2012 | Kisch et al. | |
| 8,156,988 B2 | 4/2012 | Martinez | |
| 8,205,532 B2 | 6/2012 | DeVlieg et al. | |
| 2003/0015298 A1 | 1/2003 | Steelman et al. | |
| 2003/0102070 A1 | 6/2003 | Black et al. | |
| 2003/0145932 A1 | 8/2003 | Holmes et al. | |
| 2004/0026025 A1 | 2/2004 | Sana et al. | |
| 2004/0112534 A1 | 6/2004 | Koizumi et al. | |
| 2004/0226651 A1 | 11/2004 | Ledet et al. | |
| 2005/0016671 A1 | 1/2005 | Sharp | |
| 2005/0039842 A1 | 2/2005 | Clark et al. | |
| 2005/0039843 A1 | 2/2005 | Johnson et al. | |
| 2005/0194210 A1 | 9/2005 | Panossian | |
| 2005/0227124 A1 | 10/2005 | Merton | |
| 2005/0247396 A1 | 11/2005 | Oldani et al. | |
| 2006/0073309 A1 | 4/2006 | Hogg | |
| 2006/0090856 A1 | 5/2006 | Nelson et al. | |
| 2006/0106507 A1 | 5/2006 | Ledet et al. | |
| 2006/0118244 A1 | 6/2006 | Zaballos et al. | |
| 2006/0147669 A1 | 7/2006 | Mano et al. | |
| 2006/0162143 A1 | 7/2006 | Nelson et al. | |
| 2006/0180270 A1 | 8/2006 | Ledet et al. | |
| 2006/0226651 A1 | 10/2006 | Griswold et al. | |
| 2006/0260751 A1 | 11/2006 | Lauder et al. | |
| 2007/0029030 A1 | 2/2007 | McCowin | |
| 2007/0034340 A1 | 2/2007 | Kaczkowski | |
| 2007/0039434 A1 | 2/2007 | DeVileg et al. | |
| 2007/0044896 A1 | 3/2007 | Tingley | |
| 2007/0044900 A1 | 3/2007 | Tingley | |
| 2007/0069080 A1 | 3/2007 | Rassaian et al. | |
| 2007/0102239 A1 | 5/2007 | Liguore et al. | |
| 2007/0106407 A1 | 5/2007 | Drumheller et al. | |
| 2007/0106418 A1 | 5/2007 | Hagen et al. | |
| 2007/0144676 A1 | 6/2007 | Tang et al. | |
| 2007/0150087 A1 | 6/2007 | Tang et al. | |
| 2007/0187024 A1 | 8/2007 | Johnson et al. | |
| 2007/0234907 A1 | 10/2007 | Torres Martinez | |
| 2008/0277057 A1 | 11/2008 | Montgomery et al. | |
| 2008/0282863 A1 | 11/2008 | McCowin | |
| 2008/0302483 A1 | 12/2008 | Vaniglia | |
| 2009/0025875 A1 | 1/2009 | Hagman | |
| 2009/0076638 A1 | 3/2009 | Hu et al. | |
| 2009/0078361 A1 | 3/2009 | Kisch et al. | |
| 2009/0079998 A1 | 3/2009 | Anderson et al. | |
| 2009/0082892 A1 | 3/2009 | Tang et al. | |
| 2009/0166467 A1 | 7/2009 | Hagman et al. | |
| 2009/0205767 A1 | 8/2009 | Lauder et al. | |
| 2009/0211698 A1 | 8/2009 | McCowin | |
| 2009/0301648 A1 | 12/2009 | Hogg et al. | |
| 2010/0006205 A1 | 1/2010 | McCowin et al. | |
| 2010/0193103 A1 | 8/2010 | McCowin | |
| 2010/0224716 A1 | 9/2010 | McCowin | |
| 2010/0230043 A1 | 9/2010 | Kisch | |
| 2011/0114265 A1 | 5/2011 | Hagman et al. | |
| 2011/0277941 A1 | 11/2011 | Hagman | |
| 2013/0037649 A1 | 2/2013 | McCowin | |

FOREIGN PATENT DOCUMENTS

| | | |
|---|---|---|
| DE | 10342658 A1 | 4/2005 |
| EP | 1775108 A1 | 4/2007 |
| EP | 1804146 A1 | 7/2007 |
| EP | 1859917 A2 | 11/2007 |
| EP | 1977882 A1 | 10/2008 |
| EP | 1992473 A1 | 11/2008 |
| EP | 2077246 A2 | 7/2009 |
| EP | 2228200 A1 | 9/2010 |
| EP | 2228333 A1 | 9/2010 |
| ES | 2253005 A1 | 5/2006 |
| GB | 2065566 A | 7/1981 |
| JP | 05126536 A | 5/1993 |
| JP | 07182724 A | 7/1995 |
| JP | 08327330 A | 12/1996 |
| JP | 09210665 A | 8/1997 |
| JP | 2006347121 A | 12/2006 |
| SU | 1019227 A | 5/1983 |
| WO | WO0196223 A1 | 12/2001 |
| WO | WO03035380 A1 | 5/2003 |
| WO | WO2005030458 A2 | 4/2005 |
| WO | WO2005105641 A2 | 11/2005 |
| WO | WO2006021601 A1 | 3/2006 |
| WO | WO2006060270 A1 | 6/2006 |
| WO | WO2006101379 A2 | 9/2006 |
| WO | WO2006118692 A1 | 11/2006 |
| WO | WO2006134422 | 12/2006 |
| WO | WO2009038895 A1 | 3/2009 |
| WO | WO2009038943 A1 | 3/2009 |
| WO | WO2009108517 A1 | 9/2009 |
| WO | WO2010005996 A2 | 1/2010 |

OTHER PUBLICATIONS

Notice of Allowance, dated Nov. 13, 2014, regarding U.S. Appl. No. 12/498,307, 12 pages.

Office Action dated Apr. 25, 2014, regarding U.S. Appl. No. 12/498,307, 50 pages.

European Search Report dated Sep. 15, 2008, regarding Application No. EP08008877 (EP1992473), 3 pages.

European Search Report dated Nov. 30, 2010, regarding Application No. EP08173139 (EP2077246), 2 pages.

European Search Report dated Jun. 7, 2010, regarding Application No. EP10250405 (EP2228333), 2 pages.

European Search Report dated Jun. 23, 2010, regarding Application No. EP10250484 (EP2228200), 3 pages.

International Search Report dated Apr. 1, 2005, regarding Application No. PCT/US2004/015144 (WO2005030458), 2 pages.

International Search Report dated Aug. 30, 2006, regarding Application No. PCT/US2006/010704 (WO2006118692), 3 pages.

International Search Report dated Dec. 3, 2008, regarding Application No. PCT/US2008/072450 (WO2009038895), 3 pages.

International Search Report dated Mar. 2, 2009, regarding Application No. PCT/US2008/074612 (WO2009038943), 4 pages.

International Search Report and Written Opinion, dated May 25, 2009, regarding Application No. PCT/US2009/034048, 15 pages.

International Search Report dated Feb. 5, 2010, regarding Application No. PCT/US2009/049850 (WO2010005996), 2 pages.

Ashizawa et al., "Manufacturing Technology for Polymer Composite Structures," JTEC Panel Report on Advanced Manufacturing Technology for Polymer Composite Structures in Japan, Apr. 1994, 20 pages.

Cincinnati Milacron, "Into the Future With Better Ways to Automate the Manufacture of Composite Parts," Cincinnati Milacron Publication No. SP-152-3, 1998, 22 pages.

(56) References Cited

OTHER PUBLICATIONS

Collins, "Measuring Small," Computer Technology Review, vol. XXV, No. 3, 2005, 5 pages.
Evans et al., "Fiber Placement Process Study," Sampe 34th Symposium Book of Proceedings, Reno, NV, May 8-11, 1989, pp. 1822-1833.
Guillermin, "Advanced Composite Engineering using MSC.Pantran and FiberSIM." Composite Design Technologies, Jul. 20, 2004, 15 pages.
Koschmieder et al., "On-Line Tow Width Measurement in Filament Winding," Proceedings of the 45th International SAMPE Symposium and Exhibition, Long Beach, CA, May 21-25, 2000, pp. 1417-1426.
Morrison et al., "Automatic Controlled Apparatus for Producing Tobacco Smoke Filter Rods," USPTO Defensive Publication No. T941,011, Dec. 2, 1975, 3 pages.
Olsen et al., "Automated Composite Tape Lay-up Using Robotic Devices," Proceedings of the International Conference on Robotics and Automation, Atlanta, GA, May 1993, pp. 291-297.
Office Action dated May 17, 2011 regarding U.S. Appl. No. 12/038,155, 11 pages.
Final Office Action dated Oct. 19, 2011 regarding U.S. Appl. No. 12/038,155, 9 pages.
Notice of Allowance, dated Jun. 10, 2013 regarding U.S. Appl. No. 12/038,155, 53 pages.
Office Action dated Apr. 12, 2010 regarding U.S. Appl. No. 12/400,600, 14 pages.
Final Office Action dated Sep. 17, 2010 regarding U.S. Appl. No. 12/400,600, 18 pages.
Notice of Allowance dated Mar. 28, 2012 regarding U.S. Appl. No. 12/400,600, 5 pages.
Notice of Allowance, dated Jun. 28, 2012 regarding U.S. Appl. No. 12/400,600, 64 pages.
Supplemental Notice of Allowance, dated Jul. 31, 2012, regarding U.S. Appl. No. 12/400,600, 4 pages.
Office Action dated Jan. 11, 2005 regarding U.S. Appl. No. 10/437,067, 10 pages.
Final Office Action dated Jul. 1, 2005 regarding U.S. Appl. No. 10/437,067, 9 pages.
Office Action dated Feb. 17, 2006 regarding U.S. Appl. No. 10/437,067, 10 pages.
Notice of Allowance dated Sep. 13, 2006 regarding U.S. Appl. No. 10/437,067, 7 pages.
Supplemental Notice of Allowance dated Dec. 27, 2006 regarding U.S. Appl. No. 10/437,067, 4 pages.
Office Action, dated Feb. 6, 2008, regarding U.S. Appl. No. 11/116,222, 13 pages.
Final Office Action, dated Sep. 5, 2008, regarding U.S. Appl. No. 11/116,222, 12 pages.
Notice of Allowance, dated Mar. 27, 2009, regarding U.S. Appl. No. 11/116,222, 4 pages.
Office Action, dated Jun. 9, 2009, regarding U.S. Appl. No. 11/116,222, 12 pages.
Office Action, dated Nov. 24, 2009, regarding U.S. Appl. No. 11/116,222, 9 pages.
Notice of Allowance, dated Mar. 25, 2010, regarding U.S. Appl. No. 11/116,222, 5 pages.
Office Action dated Feb. 1, 2010 regarding U.S. Appl. No. 12/423,472, 36 pages.
Office Action dated Jul. 8, 2010 regarding U.S. Appl. No. 12/423,472, 25 pages.
Notice of Allowance dated Sep. 17, 2010 regarding U.S. Appl. No. 12/423,472, 6 pages.
Office Action, dated Mar. 5, 2008, regarding U.S. Appl. No. 11/196,455, 12 pages.
Final Office Action, dated Jul. 17, 2008, regarding U.S. Appl. No. 11/196,455, 11 pages.
Office Action, dated Jan. 28, 2009, regarding U.S. Appl. No. 11/196,455, 10 pages.
Final Office Action, dated Jul. 9, 2009,, regarding U.S. Appl. No. 11/196,455, 9 pages.
Notice of Allowance, dated Nov. 4, 2009, regarding U.S. Appl. No. 11/196,455, 8 pages.
Office Action, dated Aug. 13, 2009, regarding U.S. Appl. No. 11/750,154, 12 pages.
Office Action, dated Dec. 28, 2009, regarding U.S. Appl. No. 11/750,154, 7 pages.
Office Action, dated May 25, 2010, regarding U.S. Appl. No. 11/750,154, 7 pages.
Final Office Action, dated Sep. 14, 2010, regarding U.S. Appl. No. 11/750,154, 5 pages.
Office Action dated Aug. 21, 2009 regarding U.S. Appl. No. 11/856,372, 21 pages.
Final Office Action dated Jan. 27, 2010 regarding U.S. Appl. No. 11/856,372, 16 pages.
Notice of Allowance dated Apr. 30, 2010 regarding U.S. Appl. No. 11/856,372, 4 pages.
Supplemental Notice of Allowance dated Jul. 21, 2010 regarding U.S. Appl. No. 11/856,372, 2 pages.
Office Action dated Sep. 15, 2010 regarding U.S. Appl. No. 11/829,525, 11 pages.
Final Office Action dated Feb. 2, 2011 regarding U.S. Appl. No. 11/829,525, 12 pages.
Notice of Allowance dated Jun. 21, 2011 regarding U.S. Appl. No. 11/29,525, 8 pages.
Office Action, dated Jun. 21, 2012, regarding U.S. Appl. No. 13/189,160, 45 pages.
Notice of Allowance, dated Feb. 19, 2013, regarding U.S. Appl. No. 13/189,160, 18 pages.
Office Action dated Mar. 31, 2010 regarding U.S. Appl. No. 11/859,745, 18 pages.
Final Office Action dated Oct. 14, 2010 regarding U.S. Appl. No. 11/859,745, 22 pages.
Office Action dated Mar. 28, 2011 regarding U.S. Appl. No. 11/859,745, 24 pages.
Notice of Allowance dated Feb. 13, 2012 regarding U.S. Appl. No. 11/859,745, 9 pages.
Notice of Allowance dated Jun. 8, 2012 regarding U.S. Appl. No. 11/859,745, 40 pages.
Supplemental Notice of Allowance dated Jun. 19, 2012 regarding U.S. Appl. No. 11/859,745, 38 pages.
Office Action dated Aug. 19, 2010 regarding U.S. Appl. No. 11/968,542, 10 pages.
Notice of Allowance dated Dec. 17, 2010 regarding U.S. Appl. No. 11/968,542, 9 pages.
Notice of Allowance dated Apr. 25, 2012 regarding U.S. Appl. No. 13/012,617, 16 pages.
Notice of Allowance, dated Jul. 9, 2012, regarding U.S. Appl. No. 13/012,617, 36 pages.
Office Action dated Nov. 7, 2011 regarding U.S. Appl. No. 12/498,307, 15 pages.
Final Office Action dated Mar. 8, 2012 regarding U.S. Appl. No. 12/498,307, 14 pages.
Office Action, dated May 10, 2011, regarding U.S. Appl. No. 12/363,749, 12 pages.
Final Office Action dated Feb. 21, 2012, regarding U.S. Appl. No. 12/363,749, 8 pages.
Office Action, dated Feb. 1, 2013, regarding U.S. Appl. No. 12/363,749, 45 pages.
Office Action dated Jun. 22, 2011 regarding U.S. Appl. No. 12/404,265, 10 pages.
Notice of Allowance dated Nov. 10, 2011 regarding U.S. Appl. No. 12/404,265, 9 pages.
Notice of Allowance dated Feb. 17, 2012 regarding U.S. Appl. No. 12/404,265, 11 pages.

\* cited by examiner

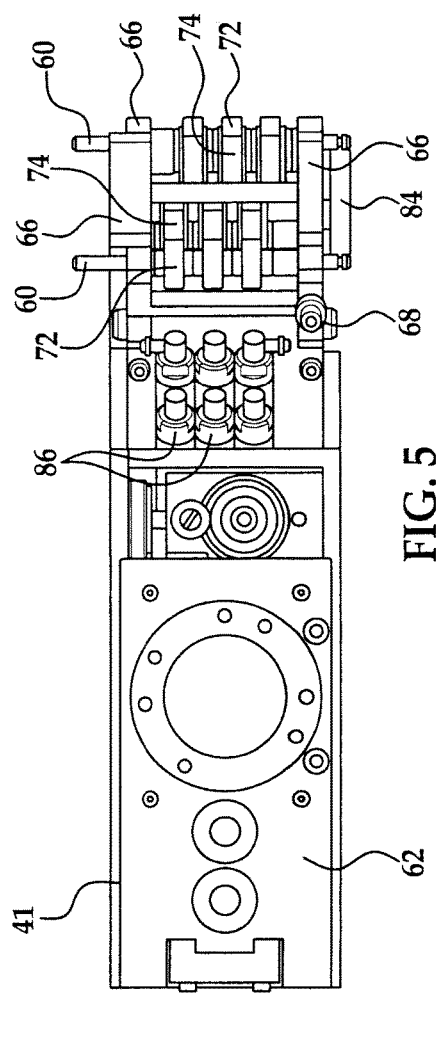
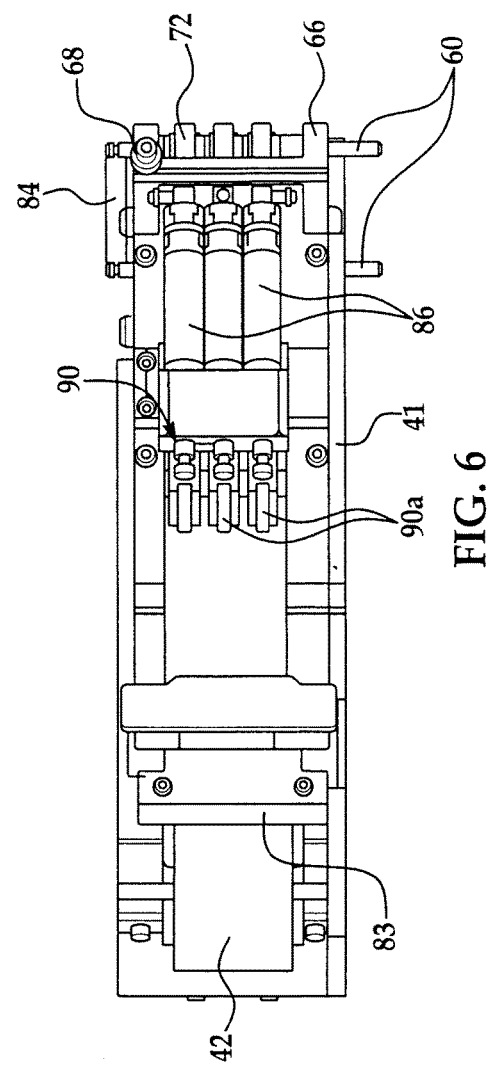
FIG. 5
FIG. 6

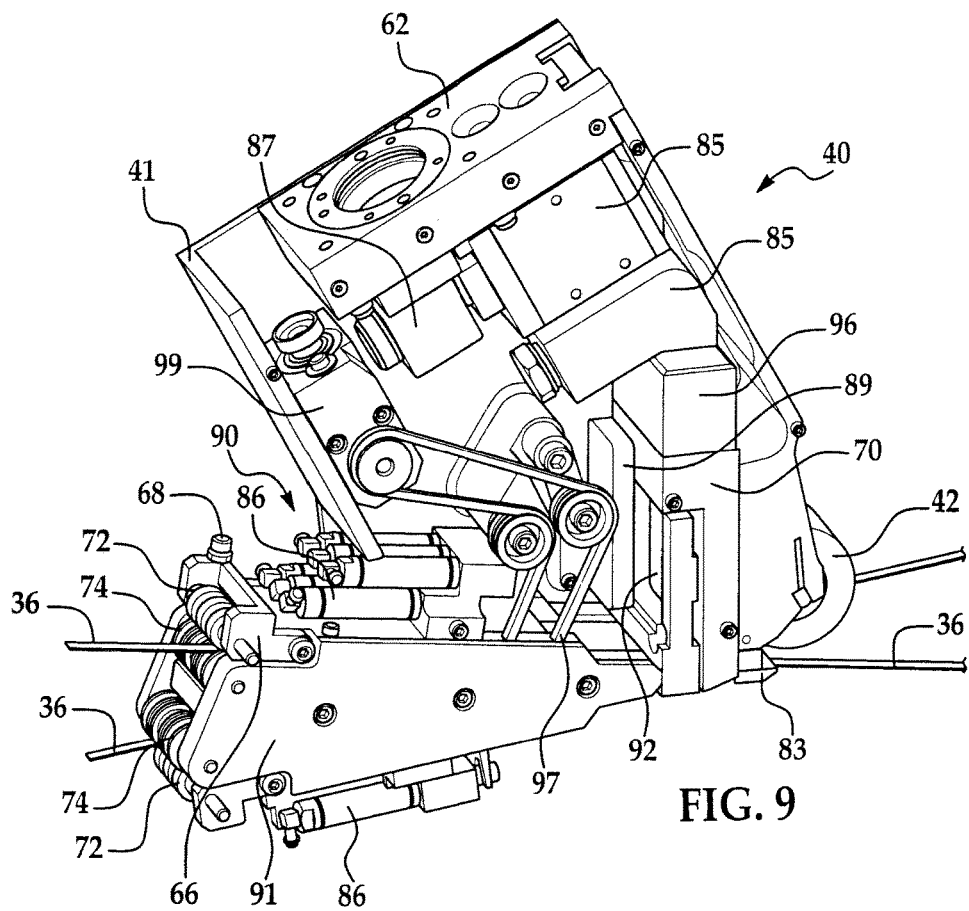
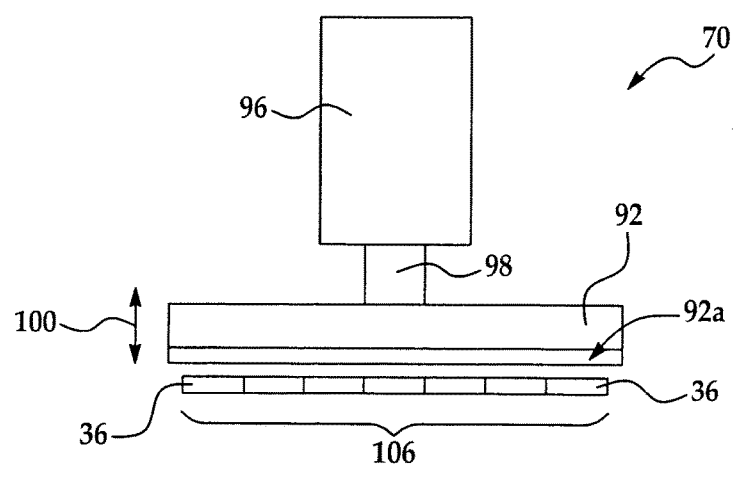

REDUCED COMPLEXITY AUTOMATIC FIBER PLACEMENT APPARATUS AND METHOD

This application is a divisional of application Ser. No. 12/038,155 filed Feb. 27, 2008, status allowed.

TECHNICAL FIELD

This disclosure generally relates to automated fiber placement systems, especially those used to layup composite structures, and deals more particularly with a simplified apparatus for the placing fibers as well as a related method.

BACKGROUND

Composite structures such as those used in the automotive, marine and aerospace industries may be fabricated using automated composite material application machines, commonly referred to as automated fiber placement (AFP) machines. AFP machines may be used in the aircraft industry, for example to fabricate structural shapes and skin assemblies by wrapping relatively narrow strips of composite, slit tape or "tows", collimated into a wider band, around a manufacturing tool. The AFP machine aligns and places a plurality of tape strips, typically six or more, in continuous, edge to edge contact forming a single wide, conformal bandwidth which is placed on and compacted against the tool.

In order to fabricate large, complex laminated composite assemblies, current AFP machines may use fiber placement heads having a relatively high degree of operational flexibility. For example, current placement heads may have the ability to add drop-off or cut any or all of the contiguous tape strips independently of all others by providing separate, independently controllable cutters for each tape strip. Current placement heads therefore may be relatively complex, large and heavy.

The size, weight and complexity of current placement heads may preclude their use in fabricating relatively small composite laminate assemblies, or in fabricating layups that require relatively high placement resolution. Moreover, because of their complexity, current placement heads are relatively expensive.

Accordingly, there is a need for automatic fiber placement apparatus that has reduced mechanical complexity and is both smaller in size and lighter in weight for those fiber applications requiring higher placement resolution and/or simplified tape application. Further, there is a need for a method of fiber placement using less complex placement machines that allows fiber placement forming ramped or contoured tape patterns.

SUMMARY

Automatic fiber placement apparatus and related methods are provided which are particularly useful in fabricating relatively small, laminated composite fiber structures, and as well as larger composite structures requiring a high degree tape placement resolution. The complexity, size and weight of the placement head is reduced by employing a single cutting mechanism to simultaneously cut the ends of all of the tape strips at the end of a course, thus eliminating the need for separate cutting mechanisms for each tape strip. In spite of this reduced mechanical complexity, contoured or ramped tape application patterns may be achieved by sequentially starting the placement of each tape strip as a band of strips are laid down.

According to one disclosed embodiment, a method is provided for forming a composite layup on a substrate, comprising: moving an automatic fiber placement head over the substrate; using the fiber placement head to lay down multiple, parallel strips of composite tape on the substrate, including staggering the start of at least certain of the tape strips so as to form a contour pattern; and, cutting the ends of all of the tape strips using a single cut. Cutting the ends of the tape strips may be performed by passing a single cutting blade through all the tape strip substantially simultaneously.

According to another method embodiment, placing composite fiber tape on a substrate using an automatic fiber placement head comprises: moving the fiber placement head across the substrate from a starting position to an ending position; sequentially starting the placement of individual fiber tape strips onto the substrate to form a band as the placement moves from the starting position to the ending position; and, cutting all of the tape strips in the band substantially simultaneously at the ending position. Sequentially starting the placement of the individual fiber tape strips may be performed by sequentially activating individual tape threading mechanisms on the fiber placement head. Cutting all the tape strips may be performed by activating a single cutting blade mechanism on the fiber placement head and using the single cutting blade mechanism to cut all the tape strips.

According to a further method embodiment, a composite fiber layup is formed on a substrate having a substrate feature, comprising: moving an automatic tape placement head across the substrate away from the substrate feature in a first direction; using the placement head to lay down a first band of composite tape strips as the placement head moves across the substrate in the first direction, including staggering the starting points of at least certain of the tape strips in the first group to form a ramp pattern on one side of the substrate feature; cutting all of the tape strips in the first band at an ending point of the tape strips in the first band; moving the automatic tape placement head across the substrate away from the substrate feature in a second direction; using the placement head to lay down a second band of composite tape strips as the placement head moves across the substrate in the second direction, including staggering the starting points of at least certain of the tape strips in the second band to form a second ramp pattern on another side of the substrate feature; and, cutting all of the tape strips in the second band at an ending point of the tape strips in the second band. Cutting the tape strips in the first and second bands is performed by passing a single cutting blade through all the tape strips in the group substantially simultaneously. Laying down the tape strips in each of the first and second bands may be performed during a single pass of the placement head. Movement of the placement head in each of the first and second directions is commenced from a centerline passing substantially through the substrate feature. Laying down the composite tape strips may be performed by sequentially activating individual tape threading mechanisms on the fiber placement head.

According to another disclosed embodiment, a fiber tape placement apparatus is provided for placing fiber tape on a substrate, comprising: a plurality of tape supply devices each holding a supply of fiber tape; a device for compacting the tape on the substrate; a plurality of threading mechanisms respectively associated with the tape supply devices and each operable for initiating tape feed from one of the tape supply devices to the compaction device; and, a cutting device including a single cutting blade for cutting the ends of all the tapes fed to the compaction device substantially simultaneously. The cutting blade includes a cutting edge extending transversely across the paths along which the tapes are fed to the compaction device. The cutting device may include an actuator for displacing the cutting blade toward and away from the tapes. The tapes may be arranged in side-by-side relationship as the tapes are fed to the compaction device, and the cutting blade may be positioned to cut the ends of the tapes while the tapes are in side-by-side relationship.

The disclosed embodiments satisfy a need for an automatic fiber placement apparatus having reduced complexity, and a related method that allows layups to be formed having contoured patterns.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 5 is a top view of the machine shown in FIG. 4.

FIG. 6 is a bottom view of the machine shown in FIG. 4.

FIG. 9 is a perspective view of the machine shown in FIGS. 4-6, a cover having been removed to show additional details.

FIG. 10 is a simplified front elevational view of the tape cutting mechanism forming part of the machine shown in FIGS. 4-9.

DETAILED DESCRIPTION

Figure 1:
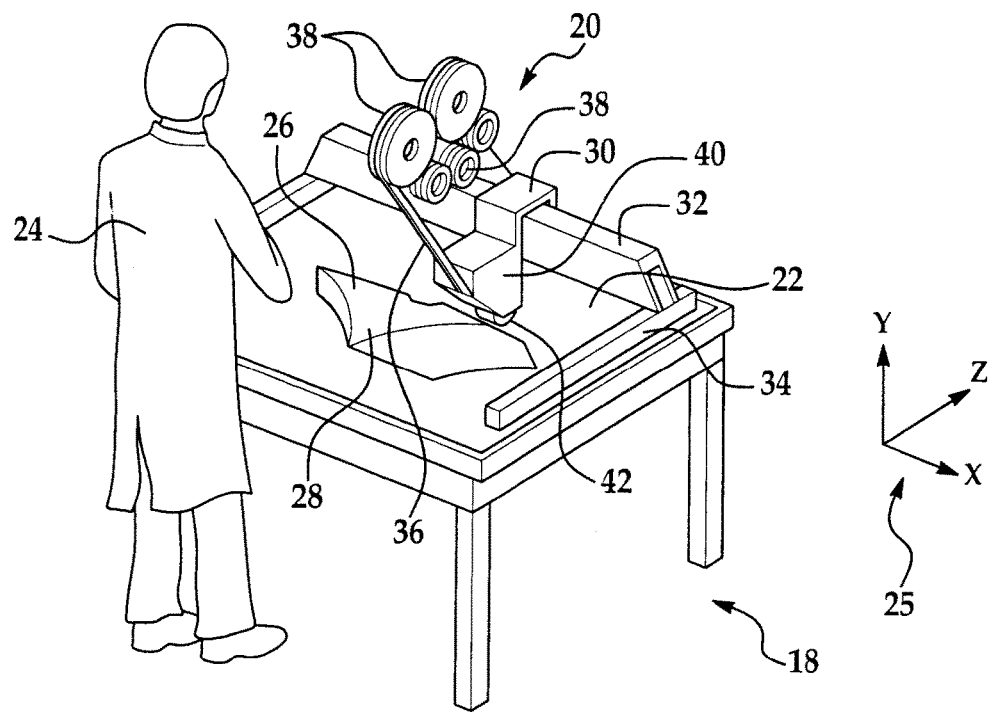
FIG. 1 is a perspective view of a single part fabrication cell having a reduced complexity fiber placement machine.

Referring first to FIG. 1, a single part fabrication cell generally indicated by the numeral 18 employs a reduced complexity composite fiber placement (AFP) machine 20 that may be used to layup relatively small, individual parts 26 over a tool 28. The AFP machine 20 may be partially or fully automatically controlled by a suitable controller (not shown) which may comprise a NC, CNC or PLC controller. The AFP machine 20 may also be at least partially controlled by an operator 24.

In the illustrated example, the AFP machine 20 is mounted for movement along orthogonal x,y,z axes shown at 25. More particularly, a tape application head 40 is mounted on a guide 30 for sliding movement along the Z axis, and the guide 30, in turn, is mounted on a gantry 32 for sliding movement along the x axis. The gantry 32 is mounted for sliding movement along the z axis by means of rails 34 that are supported on a table 22. The AFP machine includes tape supply reels 38 which supply composite fiber tape 36 to the application head 40 which includes a compaction roller 42 for compacting the tape 36 against the tool 28. As used herein, "composite fiber tape", "fiber tape", "tape" and "tape strips" are intended to include a wide range of tapes, "tows" and rovings, including those having standard widths such as, without limitation, three inches or six inches, and those having nonstandard widths such as one-eighth inch or one-quarter inch ("tows").

As will be described later in more detail, the tape 36 is drawn from the reels 38 by a later discussed tape threading mechanism which feeds tape to a nip (not shown) between the compaction roller 42 and the surface of the tool 28. Movement of the AFP machine 20 draws tape 36 from the reels 38, and the tape 36 is cut to length by a later discussed, simplified tape cutting mechanism.

Figure 2:
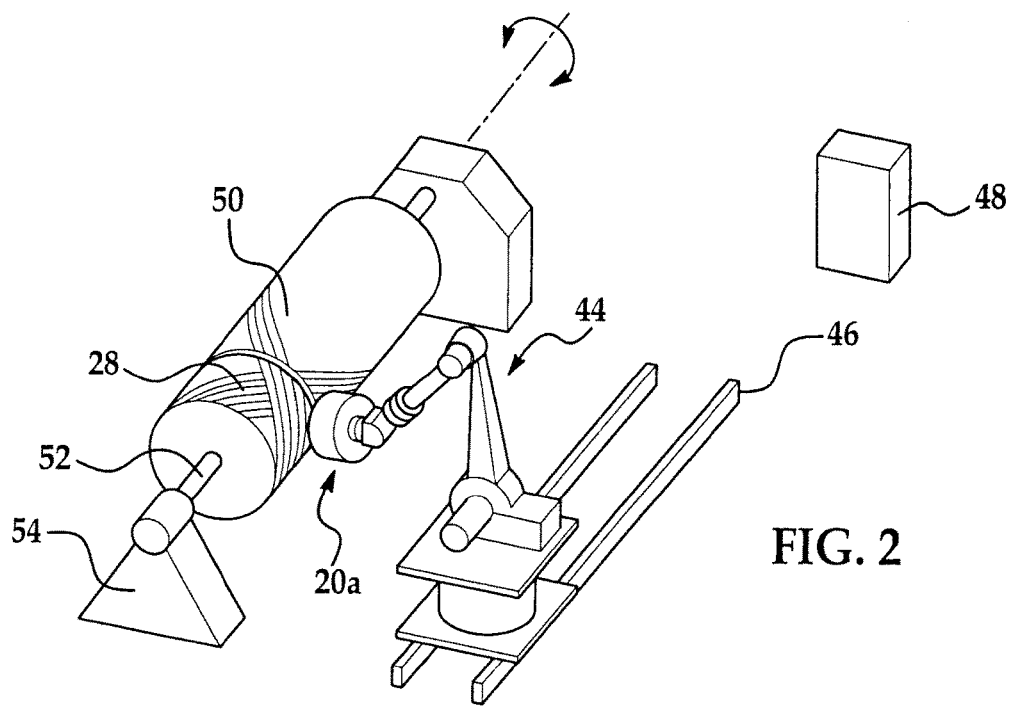
FIG. 2 is a perspective view of a large scale fiber placement cell having a reduced complexity fiber placement machine.

Referring now to FIG. 2, an alternate form of the AFP machine 20a may be used as an end effector installed on a robot 44 which is mounted for translation along rails 46. A tool, such as a cylindrical mandrel 50 is mounted by spindles 42 for rotation on supports 54. Rotation of the tool 50, as well as the operation of the robot 44 and the placement head 20a may be controlled by a NC or CNC controller 48. The placement head 20a may be used to layup bands 28 of the tape 36 on the mandrel 50 with high contour resolution.

Figure 3:
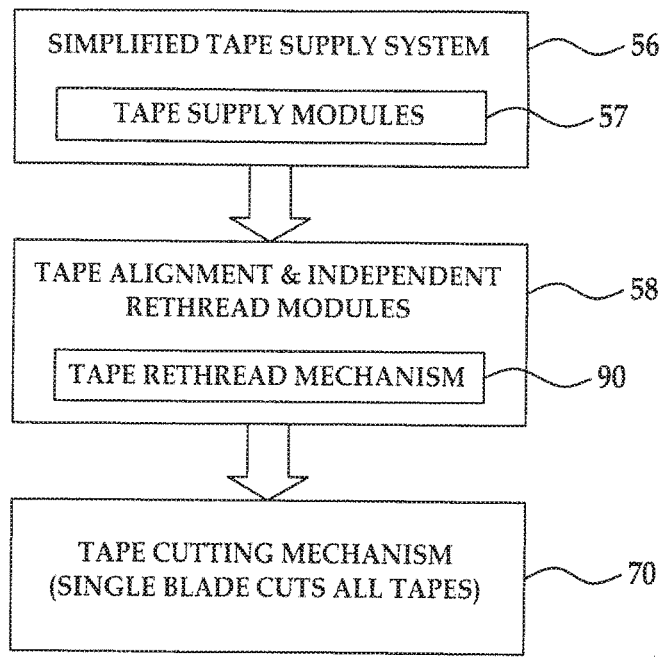
FIG. 3 is a block diagram illustrating the basic components of the reduced complexity fiber placement machine.
Figure 4:
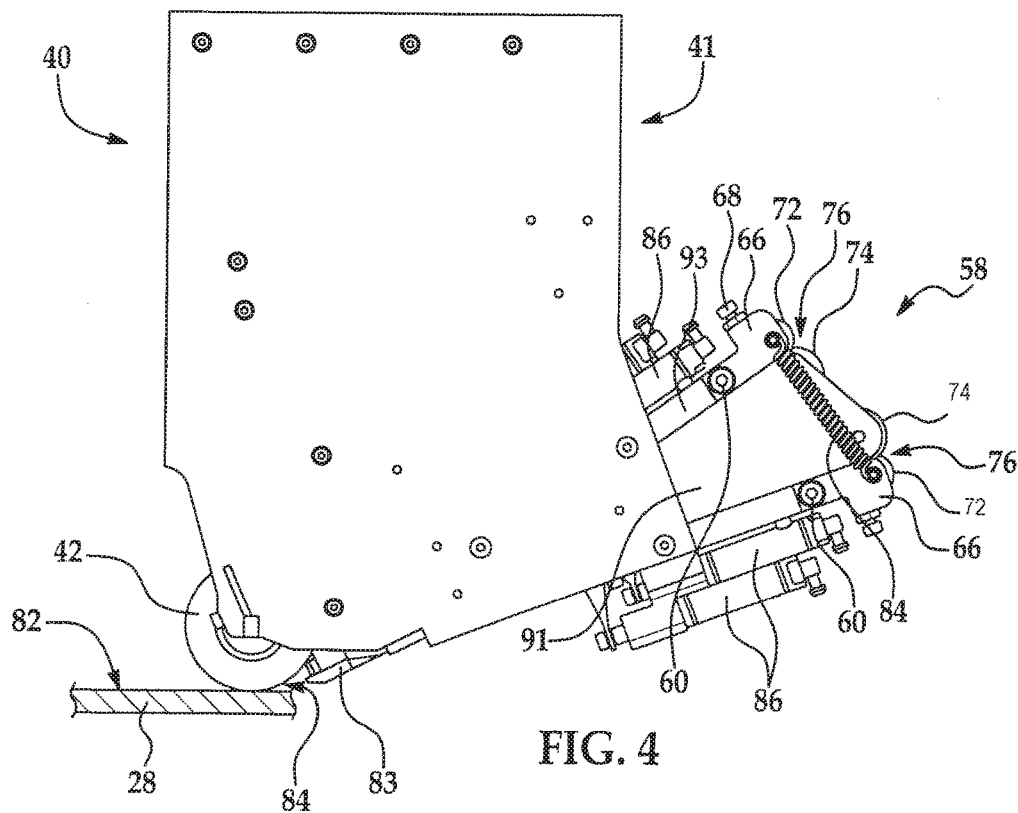
FIG. 4 is a side view of the reduced complexity fiber placement machine.
Figure 7:
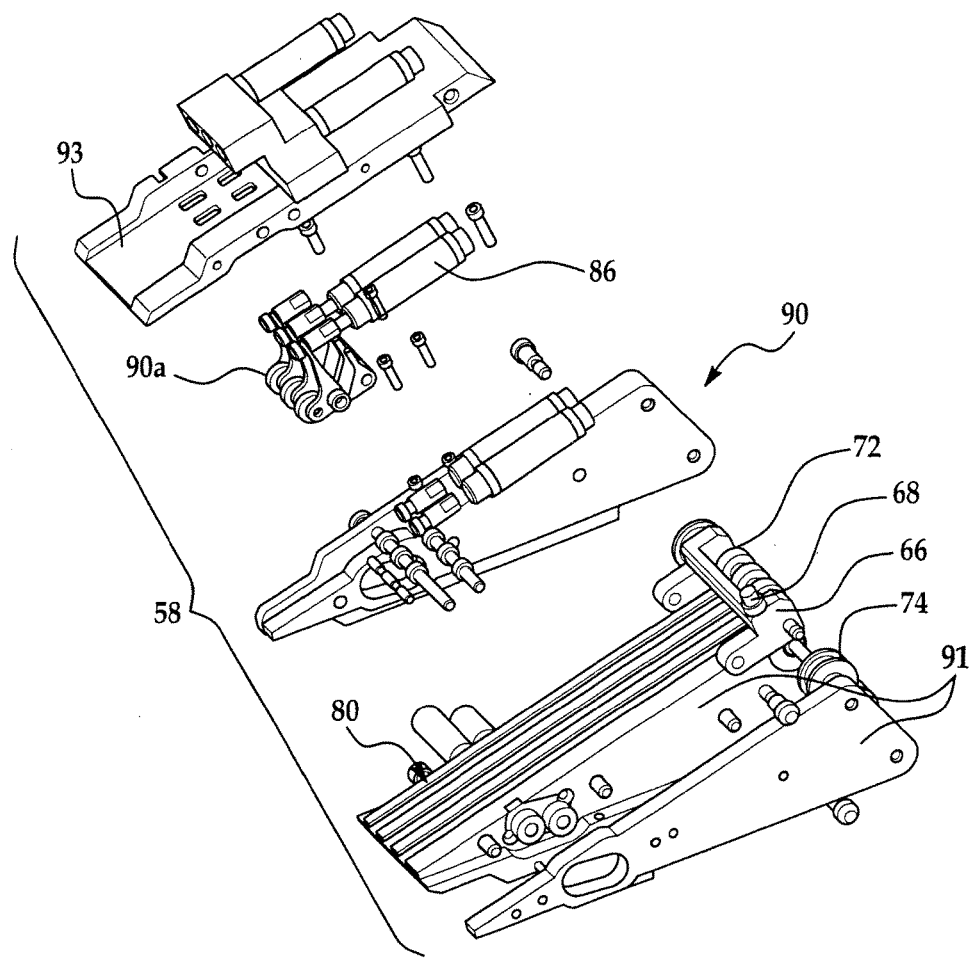
FIG. 7 is an exploded, perspective view of a rethread assembly forming part of the machine shown in FIGS. 4-6.
Figure 8:
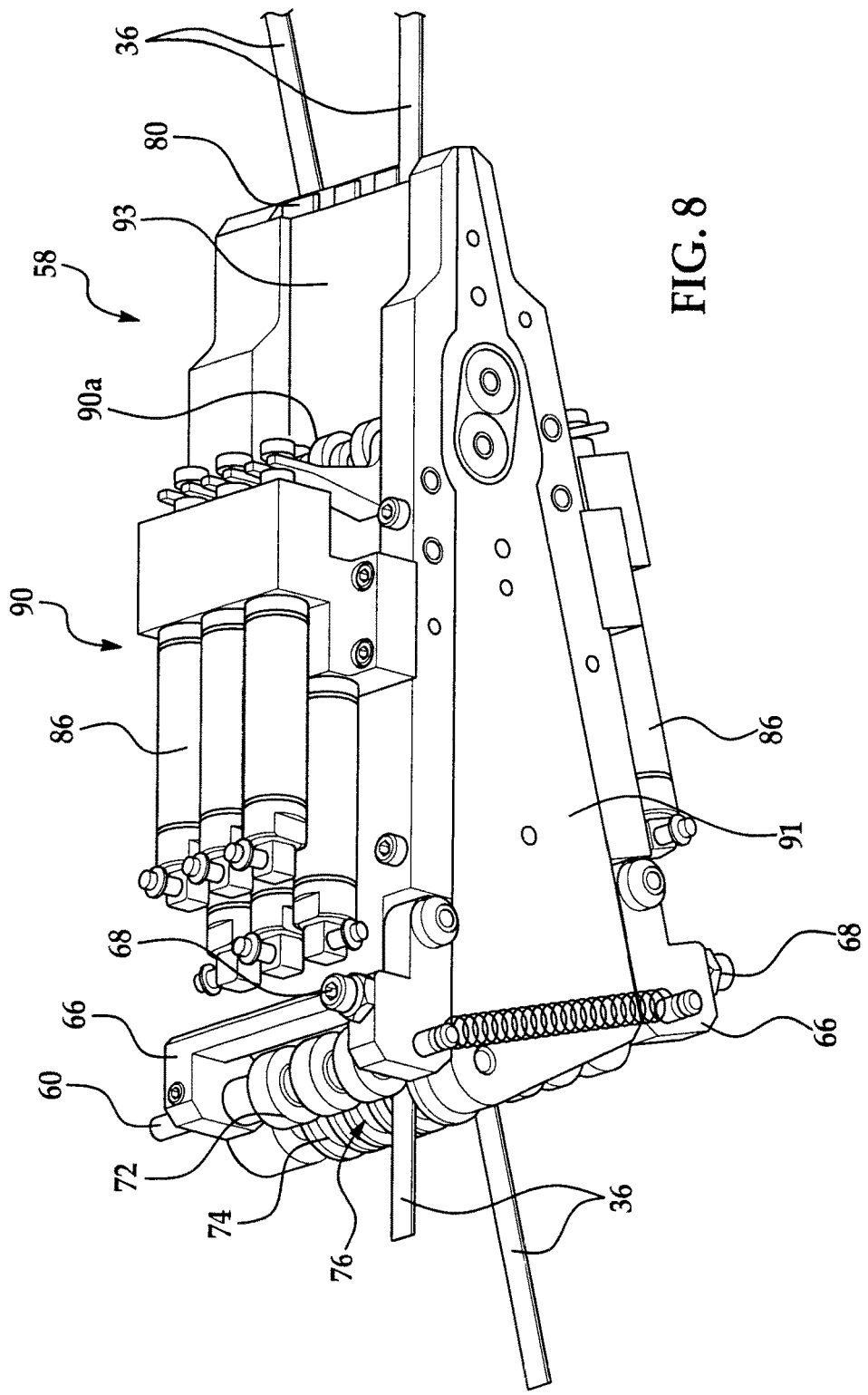
FIG. 8 is a perspective view of the rethread assembly.

Referring now to FIG. 3, the AFP machine 20 broadly includes a simplified tape supply system 56, tape alignment and independent rethread modules 58, and a single tape cutting mechanism 70 which is used to cut all of the tapes 36. The simplified material supply system 56 may comprise a number of individual tape supply modules 57 that are respectively associated with and draw tape 36 from the pre-wound tape reels 38 (FIG. 1).

Each of the tape supply modules 57 may include a simple tension drag brake (not shown) and an inertia limiting device such as a pneumatically operated disc brake (not shown), which together act to supply the tape 36 to the respectively associated tape alignment and rethread module 58, in a uniform, aligned manner. The tape alignment and rethread modules 58 align the plurality of individual tapes 36 in parallel, edge-to-edge contact using a combination of slotted guides (not shown) which may be preset in a weave pattern to provide mechanism clearance. Packaged within each alignment and rethread module 58 is a tape rethread mechanism 90 (FIG. 6). Although not specifically shown in the Figures, the tape rethread mechanism 90 uses frictional contact to drive and clamp the individual tapes 36. Additional details of the tape supply modules 57, the alignment and rethread modules 58 and the rethread mechanisms 90 may be found in U.S. Pat. No. 4,699,683, issued Oct. 13, 1987 and US Patent Publication No. 20070029030A1 published Feb. 8, 2007, the entire contents of both of which are incorporated by reference herein.

Referring now to FIGS. 4-9, the tape placement head 40 includes a frame assembly 41 having a top plate 62 adapted to be connected to a robot 44 (FIG. 2) or other tool used for moving the placement head 40 across a substrate on which tape 36 is to be placed. The tape alignment and rethread modules 58 are mounted side-by-side on a central body 91 (FIG. 7) held within the frame assembly 41. Each of the modules 58 includes a mating set of flat rollers 72 and U-shaped rollers 74 that form an entrance channel 76 for one of the tapes 36. The flat rollers 72 are mounted on a shaft 60 that is carried on a pivoting arm 66. Springs 84 bias the pivoting arms 66 toward a normal closed position in which the flat rollers are spaced a preselected distance from the U-shaped rollers 74, generally corresponding to the thickness of the tape 36. The height or thickness of the entrance channel. 76 may be adjusted through a set screw 68. The tapes 36 supplied from reels 38 (FIG. 1) are respectively received into the entrance channels 76 and are maintained in side-by-side, registered relationship by slotted guides 80 (FIG. 7) which are enclosed by a cover plate 93.

Tapes 36 are fed though the slotted guides 80 to rethread mechanisms 90 which include tape engaging rollers 90a which are moved into engagement with the tapes 36 by pneumatic cylinders 86. The rollers 90a are driven by a belt 97 powered by a motor 99. Actuation of a particular rethread mechanism 90 initiates threading of the corresponding tape 36 which is then fed through one of the slotted guides 80 to a guide member 83 which then directs the tape 36 at a predetermined angle into the nip 74 where the tape 36 is applied and compacted on the substrate 28 by the compaction roller 42. Fiber optic sensors 89 (FIG. 9) sense the position of the tapes 36, including passage of the ends of the tapes 36, and produce position signals that may be used to control tape feed and placement. The fiber optic sensors 89 also may be used to sense the operation of the blade 92, either to allow synchronization of its operation with other functions in the AFP machine 20, or simply to verify that the blade 92 is operating properly, or both.

From the foregoing, it may be appreciated that the location on the substrate surface 82 (FIG. 4) at which a particular tape 36 "starts" is dependent on the point in time when which the tape threading mechanism 90 is actuated to begin feeding tape 36 to the compaction roller 42. Since the tape threading mechanisms 90 can be independently actuated by actuators 86, the starting point of each tape 36 can be independently controlled so that these starting points may be staggered in any desired pattern, as will be described in more detail below.

As best seen in FIG. 9, in accordance with the disclosed embodiment, the tape placement head 40 further includes a tape cutting mechanism 70 comprising a pneumatic actuator 96 that reciprocates a single cutting blade 92. The pneumatic actuator 96 receives air from an air manifold which is controlled by an electric valve control cylinder 87. The cutting mechanism is also diagrammatically illustrated in FIG. 10. The single cutting blade 92 is connected to the pneumatic actuator 96 through a suitable drive linkage 98. The blade 92 includes a cutting edge 92a that spans the entire band 106 of tapes laid down by the placement head 40. Blade 92 reciprocates, as indicated by the arrow 100 in FIG. 10, so as to simultaneously sever the entire band 106 of tapes 36 in a single shear cut. As will be apparent from the description below, the ends of the tapes 36 are cut at the same point during the tape laydown process, regardless of the starting point of the tapes 36.

As used herein, reference to cutting all of the tapes 36 in a band 106 "simultaneously" or "substantially simultaneously" means that the blade 92 or other cutting device severs all of the tapes 36 in the band 106 at substantially the same point at the end of a course. Thus, a cutter (not shown) could be drawn transversely across the band 106 in a single stroke to sequentially cut the tapes in a band 106 at the end of the course, instead of contacting and severing all of the tapes 36 in the band 106 at exactly the same time, as shown in the illustrated embodiment. Further, reference to cutting the tapes 36 in a band 106 in a "single cut" or "single blade stroke" likewise means that all of the tapes 36 in a band 106 are cut at substantially the same point at the end of a course through the motion of a single cutter which contacts and severs the tapes at this ending point either simultaneously or in rapid succession.

Figure 11:
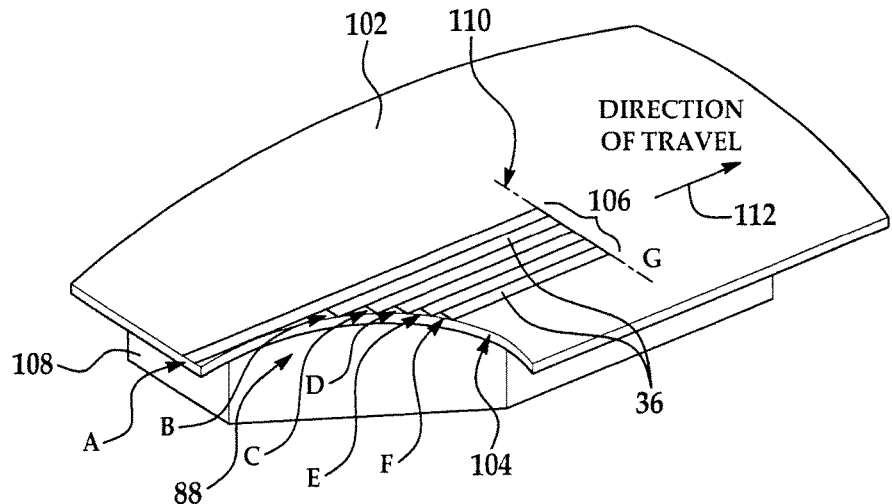
FIG. 11 is a perspective view of a tool on which a band of tapes has been placed using the reduced complexity tape placement machine.
Figure 12:
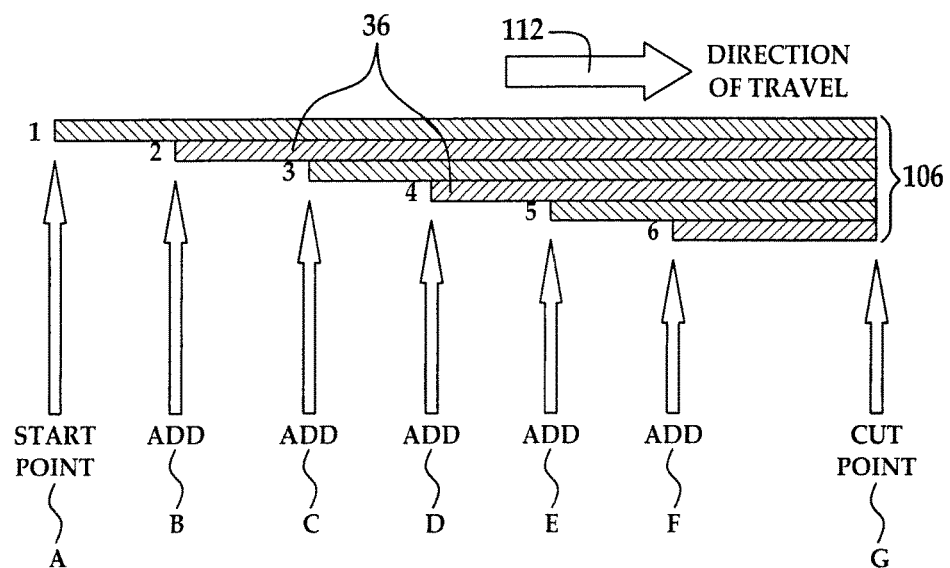
FIG. 12 is a plan view of one tape band illustrating the sequential, timed starting points of individual tape strips ending at a common cutting point.
Figure 13:
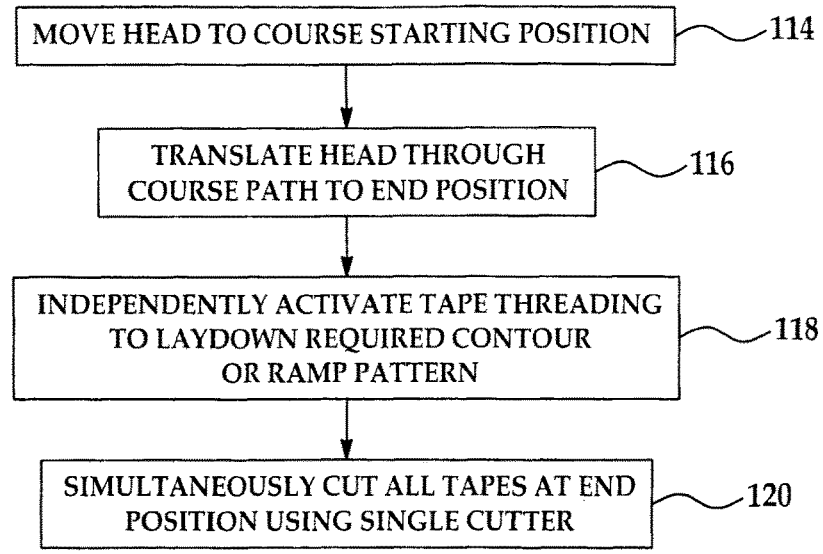
FIG. 13 is a flow diagram illustrating the basic steps of one method for placing composite tape on a substrate using the reduced complexity automatic fiber placement machine.

Reference is now made to FIGS. 11-13 which illustrate one method embodiment for forming layups using the reduced complexity AFP machine 20. In the example illustrated in FIG. 11, a contoured band 106 of parallel, contiguous tape strips 36 are laid up on a tool 102 supported on a base 104. The tool 102 includes a contoured edge 108 to which a contoured portion 88 of the band 106 may substantially conform. As shown at step 114 in FIG. 13, the placement head 40 is first moved to a starting position which corresponds to the starting point "A" of tape number 1 in the band 106. As shown at step 116 in FIG. 13, and in FIG. 11, the placement head 40 is translated in the direction of travel 112 from the starting position "A" to an ending position "G". At step 118, as the placement head 40 moves from the starting position "A" to the ending position "G", the individual tape threading mechanisms 90 are actuated to start the placement of tapes 1-6 in a sequential manner so that they are respectively added at points A-F.

The sequential starting of tapes 1-6 described above staggers the beginnings of tapes 36 so that they form the edge contour or outer profile 88 (FIG. 11) which generally matches the contoured edge 108 of the tool 102. The sequential addition of the tapes 36 to the band 107 continues until the band 106 becomes uniform at point "F". At a preselected point, as shown at step 120, the cutting mechanism 70 is actuated so as to cut the entire band 106 at the ending or cut point "G", in a single shear cut by the blade 92. It may be appreciated that the resolution of the outer profile 88 may be determined by the number of tapes 36 present under the cutting mechanism 70 at the time the single cut is initiated. Hence, for higher resolution areas, a fewer number of tapes 36 may be included within the width of the band 106 for a particular course.

Figure 14:
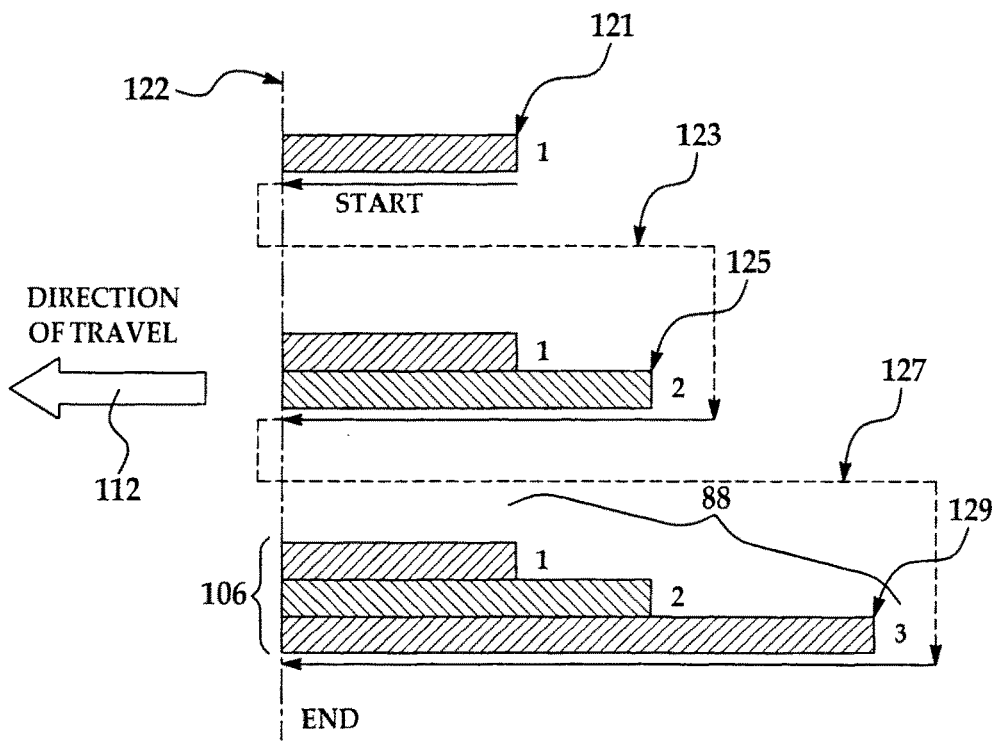
FIG. 14 is a diagrammatic, plan view showing an alternate method for placing contiguous strips of tape on a substrate.
Figure 15:
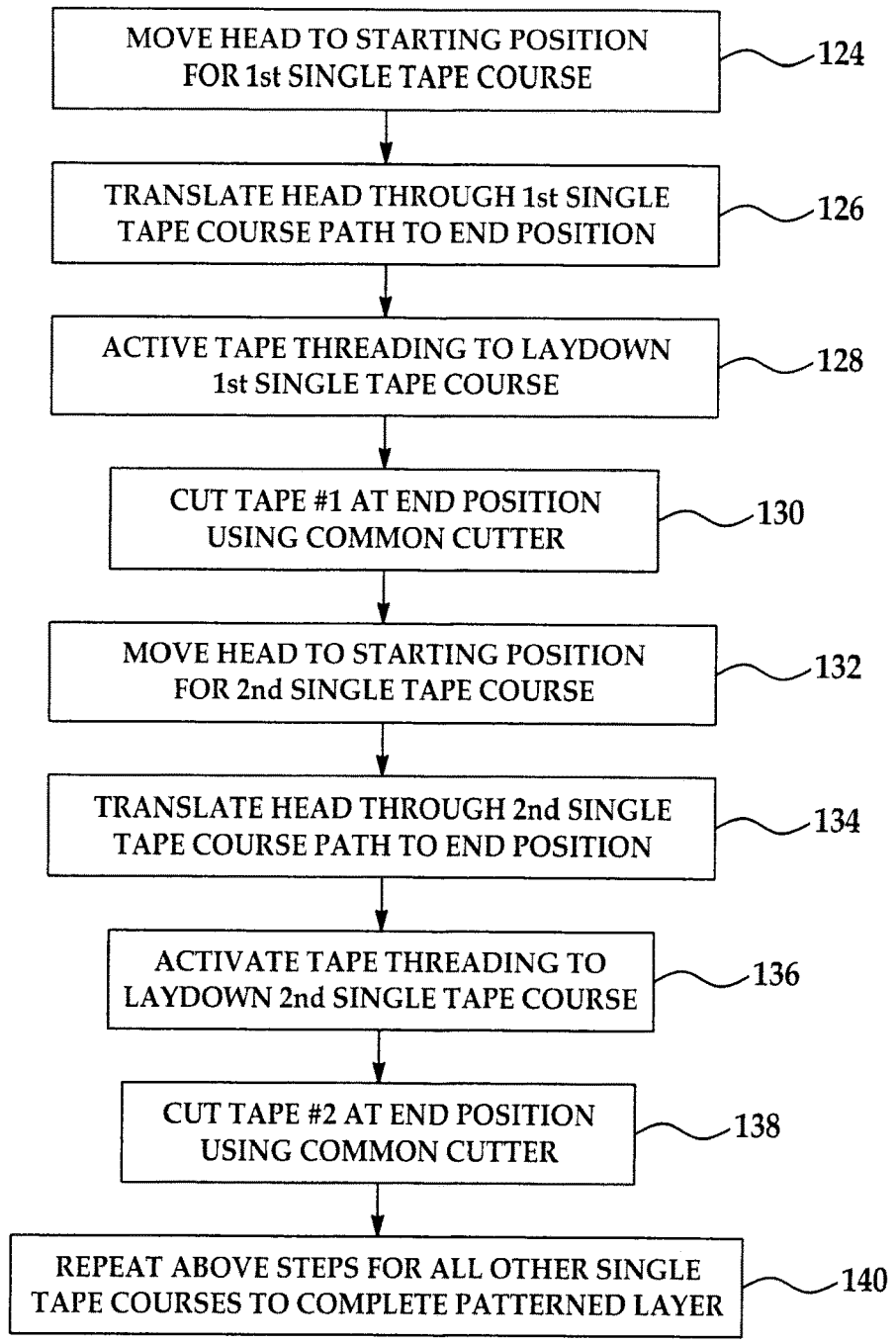
FIG. 15 is a flow diagram illustrating in more detail the alternate method for placing tape on a substrate shown in FIG. 14.

Attention is now directed to FIGS. 14 and 15 which illustrate an alternate method embodiment for placing tape 36 using the reduced complexity AFP machine 20. Beginning at step 124, the placement head 40 is moved to a starting position 121, in preparation for the placement of tape number 1. As shown in steps 126 and 128, as the placement head 40 is translated in the direction of travel 112, a single tape threading mechanism 90 is activated, thereby causing tape number 1 to be placed on the tool substrate 82. As shown at step 130, tape number 1 is cut at the end of the course or cut point indicated by the numeral 122.

Next, the placement head 40 is translated through a return path 123 to a starting position for tape number 2, as shown at step 132. At steps 134 and 136, the placement head 40 is again translated in the direction of arrow 112, while one of the tape threading mechanisms 90 is activated to begin laying tape number 2 parallel with and contiguous to tape number 1. Tape number 2 is severed by the cutting mechanism 90 at the cut point 122. Next, at step 140, the process of translating the placement head 40 through a return path to the next tape starting position 129 is repeated for each of the subsequent individual course of tape 36.

In the illustrated example, the tape head 40 is translated from the starting point 129 to the cut point 122 during which one of the tape threading mechanisms 90 is activated to lay down tape number 3, which is then cut by the cutting mechanism 70 at the cut point 122. As previously noted, the resolution of the cutting pattern or ramped profile 88 is determined by the number of tapes 36 that are present under the cutter 70 at the time the tapes 36 are cut. Thus, using the method illustrated in FIGS. 14 and 15, a fewer number of tapes 36 may be included within the total course band 106 in order to achieve higher profile resolution. While only a single tape 36 is placed and cut in the illustrated example during each pass of the tape placement head 40, two or more tapes 36 may be simultaneously placed and cut to produce the desired resolution, depending upon the application.

Figure 16:
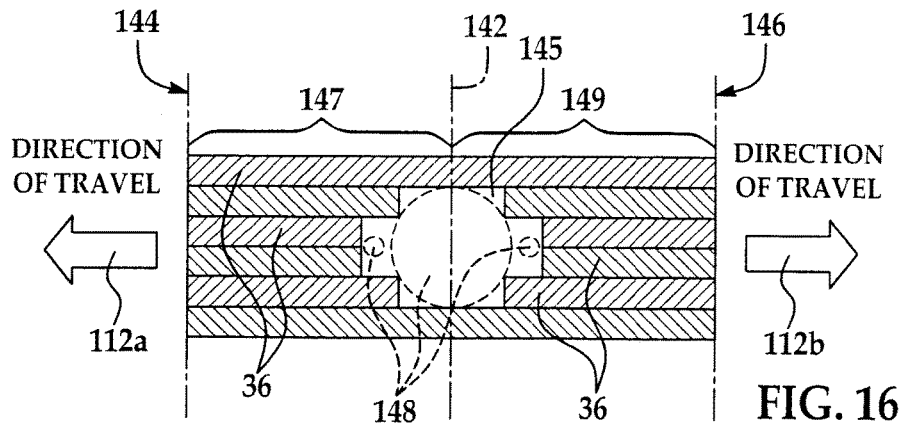
FIG. 16 is a plan view showing two bands of tape strips placed around a substrate feature.
Figure 17:
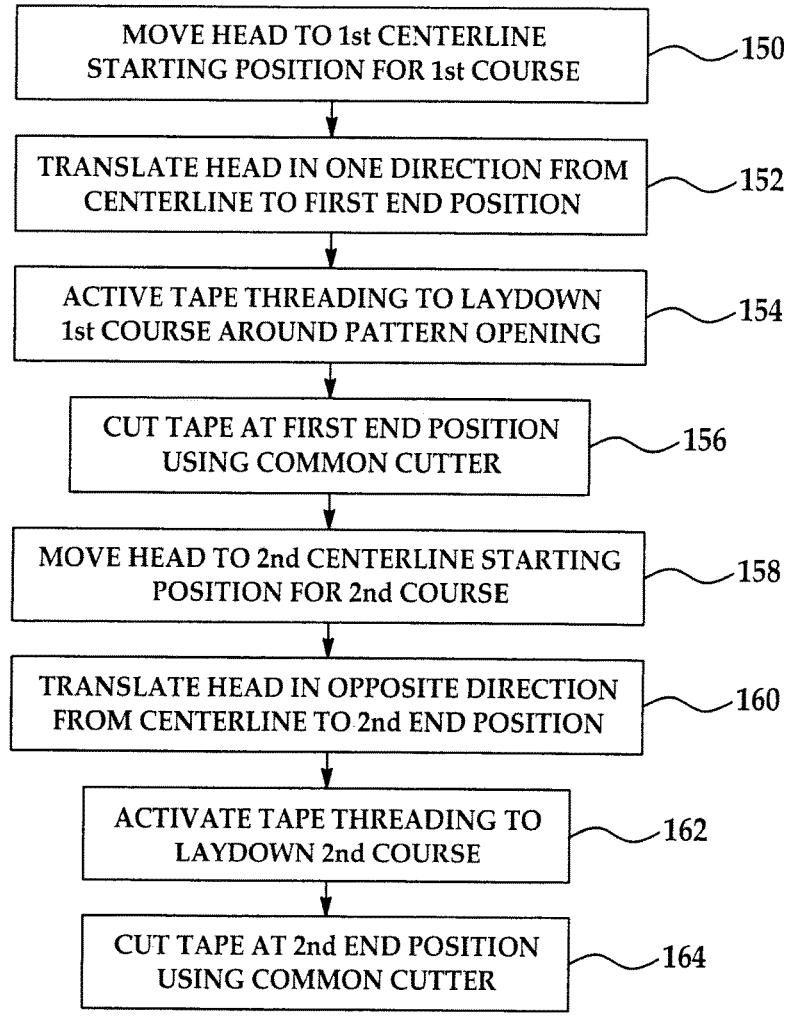
FIG. 17 is a flow diagram illustrating a method for placing tape strips around the substrate feature shown in FIG. 16.

Attention is now directed to FIGS. 16 and 17 which illustrate a further method embodiment in which the reduced complexity AFP machine 20 is used to layup tape 36 around a substrate feature, which in the illustrated example, comprise future throughholes to be formed in a substrate 145. Beginning at step 150, the placement head is moved to a starting position corresponding to the centerline 142 of the substrate features 148. Next at 152, the placement head 40 is translated in one direction of travel 112 from the centerline 142 to and ending position 144. During translation of the placement head 40, the tape threading mechanisms 90 are actuated, as shown at 154, thereby laying down a first band of tapes 147 wherein the starting points of the individual tapes 36 form a ramped pattern which are stepped around the substrate features 148. All of the tapes 36 in the first band 147 are simultaneously cut at 144, as shown at step 156 in FIGS. 16 and 17.

Next, the placement head 40 is moved back to the centerline position 142, as shown at step 158, in preparation for placing a second course 149. As shown at step 160, the head 40 is translated from the centerline 142 to an ending position 146, during which the tape threading mechanisms 90 are actuated in a predetermined time sequence so that the starting positions of the individual tapes 36 in the second band 149 form a ramp pattern that is stepped around the substrate features 148. At step 164, all of the tape strips 36 in the second band 149 are severed simultaneously at the end or cutting point 146.

Figure 18:
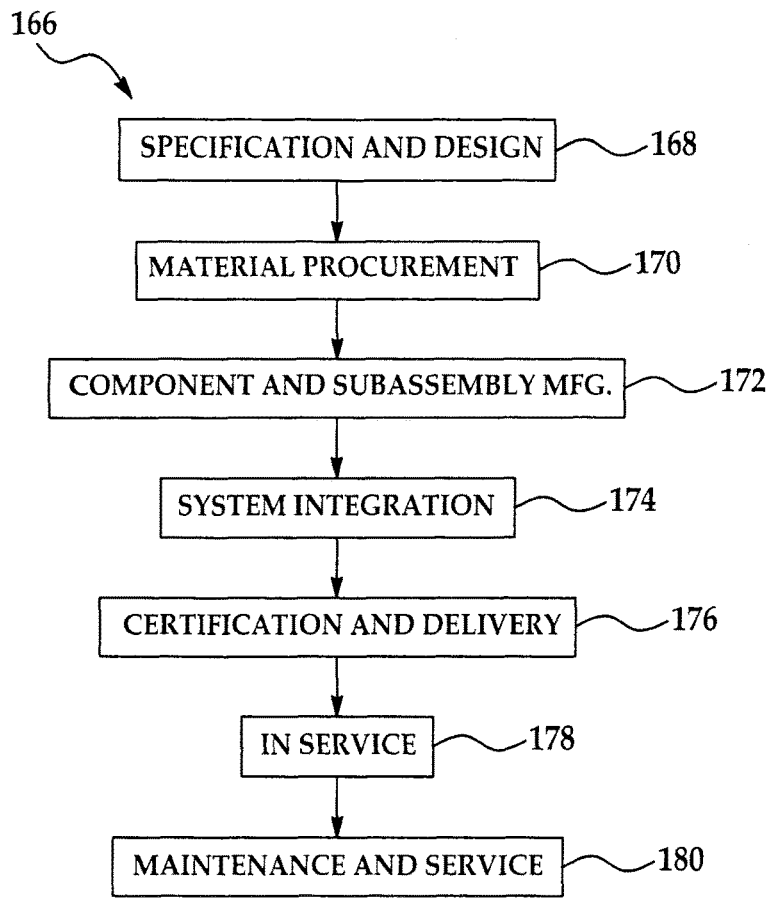
FIG. 18 is a flow diagram of aircraft production and service methodology.
Figure 19:
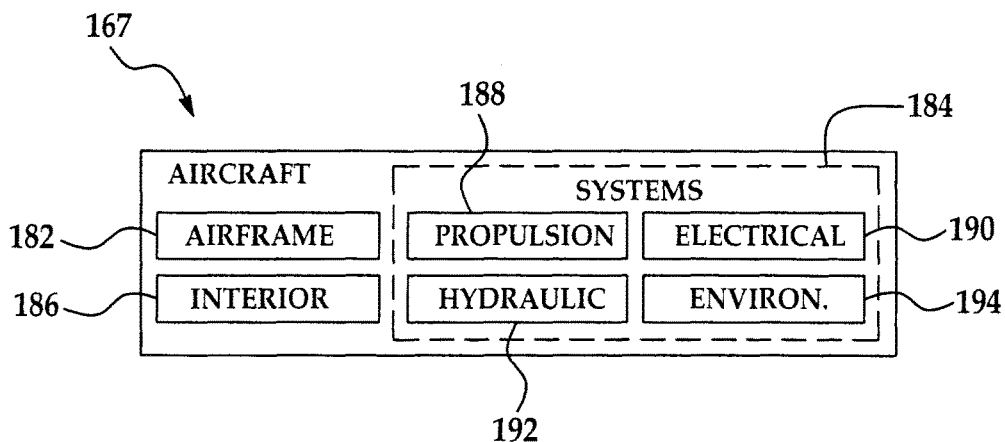
FIG. 19 is a block diagram of an aircraft.

Embodiments of the disclosure may find use in a variety of potential applications, particularly in the transportation industry, including for example, aerospace, marine and automotive applications. Thus, referring now to FIGS. 18 and 19, embodiments of the disclosure may be used in the context of an aircraft manufacturing and service method 166 as shown in FIG. 18 and an aircraft 167 as shown in FIG. 19. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 166 may include specification and design 168 of the aircraft 167 and material procurement 170. During production, component and subassembly manufacturing 172 and system integration 174 of the aircraft 167 takes place. Thereafter, the aircraft 167 may go through certification and delivery 176 in order to be placed in service 178. While in service by a customer, the aircraft 167 is scheduled for routine maintenance and service 180 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 167 produced by exemplary method 166 may include an airframe 182 with a plurality of systems 184 and an interior 186. Examples of high-level systems 184 include one or more of a propulsion system 188, an electrical system 190, a hydraulic system 192, and an environmental system 194. Any number of other systems may be included. Although an aerospace example is shown, the principles of the disclosure may be applied to other industries, such as the marine and automotive industries.

Systems and methods embodied herein may be employed during any one or more of the stages of the production and service method 166. For example, components or subassemblies corresponding to production process 166 may be fabricated or manufactured in a manner similar to components or subassemblies produced while the aircraft 167 is in service. Also, one or more apparatus embodiments, method embodiments, or a combination thereof may be utilized during the production stages 172 and 174, for example, by substantially expediting assembly of or reducing the cost of an aircraft 167. Similarly, one or more of apparatus embodiments, method embodiments, or a combination thereof may be utilized while the aircraft 167 is in service, for example and without limitation, to maintenance and service 180.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A fiber tape placement apparatus for placing fiber tape on a substrate, the fiber tape placement apparatus consisting of only:
   a plurality of tape supply devices each holding a supply of fiber tape;
   a device for compacting the fiber tape on the substrate;
   a first pivoting arm having a first end located to receive a supply of fiber tape and a second end opposite the first end;
   a second pivoting arm having a third end located to receive the supply of fiber tape and a fourth end opposite the third end, wherein the second end of the first pivoting arm is pivotally connected to the fourth end of the second pivoting arm;
   a plurality of threading mechanisms each operable for initiating tape feed from one of the tape supply devices to the device for compacting such that each tape strip individually fed to the substrate and placed on the substrate is contiguous with another of the tape strips, wherein the plurality of threading mechanisms comprises:

a first plurality of substantially flat rollers disposed at the first end of the first pivoting arm;

a second plurality of substantially flat rollers disposed at the third end of the second pivoting arm; and a plurality of U-shaped rollers, each of the plurality of U-shaped rollers being associated with corresponding ones of the first plurality of substantially flat rollers and the second plurality of substantially flat rollers, wherein the plurality of U-shaped rollers form nips with the flat rollers through which the fiber tape is fed;

a spring connected to the first pivoting arm and to the second pivoting arm, the spring configured to bias the first pivoting arm toward the second pivoting arm at the first end and the third end;

a first set screw at the first end of the first pivoting arm and a second set screw at the third end of the second pivoting arm, wherein the first set screw and the second set screw are adjustable to adjust a height of entrance channels between the plurality of substantially flat rollers and the plurality of U-shaped rollers; and a cutting device including a single cutting blade for cutting, with a single cut, the ends of all of the tapes fed to the device for compacting substantially simultaneously.

2. The fiber tape placement apparatus of claim 1, wherein the cutting blade includes a cutting edge extending transversely across the paths along which the tapes are feed to the compaction device.

3. The fiber tape placement apparatus of claim 1, wherein:
the tapes are arranged side-by-side as the tapes are fed to the compaction device, and
the cutting blade is position to cut the ends of the tapes while the tapes are in side-by-side relationship.

4. A fiber tape placement head for placing fiber tape on a substrate having a feature, the fiber tape placement head consisting of only:
a plurality of guides for guiding the movement of the fiber tape;
a first pivoting arm having a first end located to receive a supply of fiber tape and a second end opposite the first end;
a second pivoting arm having a third end located to receive the supply of fiber tape and a fourth end opposite the third end, wherein the second end of the first pivoting arm is pivotally connected to the fourth end of the second pivoting arm;

a plurality of threading mechanisms for respectively starting tape feed from the tape supply devices such that each tape strip individually fed to the substrate and placed on the substrate is contiguous with another of the tape strips, wherein the plurality of threading mechanisms comprises:
a first plurality of substantially flat rollers disposed at the first end of the first pivoting arm;
a second plurality of substantially flat rollers disposed at the third end of the second pivoting arm; and
a plurality of U-shaped rollers, each of the plurality of U-shaped rollers being associated with corresponding ones of the first plurality of substantially flat rollers and the second plurality of substantially flat rollers, wherein the plurality of U-shaped rollers form nips with the flat rollers through which the fiber tape is fed;

a spring connected to the first pivoting arm and to the second pivoting arm, the spring configured to bias the first pivoting arm toward the second pivoting arm at the first end and the third end;

a first set screw at the first end of the first pivoting arm and a second set screw at the third end of the second pivoting arm, wherein the first set screw and the second set screw are adjustable to adjust a height of entrance channels between the plurality of substantially flat rollers and the plurality of U-shaped rollers;

a compaction roller for receiving the fiber tape fed by the threading mechanisms and for compacting the fiber tape on the substrate; and a tape cutting mechanism between the threading mechanisms and the compaction roller, the cutting mechanism including a single actuator and a single cutting blade for simultaneously cutting the ends of all of the fiber tape in a single stroke.

5. The apparatus of claim 1, further comprising:
a plurality of actuators configured to sequentially start tape placement from the plurality of tape supply devices so that at least one tape strip from the plurality of tape supply devices has a start staggered relative to other tape strips from the plurality of tape supply devices.

* * * * *